United States Patent [19]

Ng

[11] Patent Number: 6,088,050
[45] Date of Patent: Jul. 11, 2000

[54] NON-IMPACT RECORDING APPARATUS OPERABLE UNDER VARIABLE RECORDING CONDITIONS

[75] Inventor: Yee Seung Ng, Fairport, N.Y.

[73] Assignee: Eastman Kodak Company, Rochester, N.Y.

[21] Appl. No.: 08/775,815

[22] Filed: Dec. 31, 1996

[51] Int. Cl.[7] ............................................. H04N 1/21
[52] U.S. Cl. ........................ 347/237; 347/183; 347/184; 347/232; 347/247; 358/455; 358/460
[58] Field of Search .................................. 347/232, 238, 347/253, 236, 237, 247, 183, 184; 399/9, 46, 267, 78; 358/455, 460

[56] References Cited

U.S. PATENT DOCUMENTS

| | | | |
|---|---|---|---|
| 4,455,562 | 6/1984 | Dolan et al. | 347/130 |
| 4,473,029 | 9/1984 | Fritz et al. | 399/236 |
| 4,546,060 | 10/1985 | Miskinis et al. | 399/267 |
| 5,134,495 | 7/1992 | Frazier et al. | 358/298 |
| 5,193,008 | 3/1993 | Frazier et al. | 358/298 |
| 5,253,934 | 10/1993 | Potucek et al. | 347/237 |
| 5,255,013 | 10/1993 | Ng et al. | 347/240 |
| 5,389,953 | 2/1995 | Agar et al. | 347/5 |
| 5,546,165 | 8/1996 | Rushing et al. | 399/78 |
| 5,557,412 | 9/1996 | Saito et al. | 399/46 |
| 5,586,055 | 12/1996 | Ng et al. | 364/526 |
| 5,694,224 | 12/1997 | Tai | 358/455 |
| 5,739,841 | 4/1998 | Ng et al. | 347/237 |

*Primary Examiner*—N. Lee
*Assistant Examiner*—Hai C. Pham
*Attorney, Agent, or Firm*—Norman Rushefsky

[57] ABSTRACT

In a non-impact recording apparatus that includes a plurality of recording elements, there is provided a source of first data signals representing for each of plural pixels density, size or percentage of coverage for recording. A first look-up table memory is responsive to the first data signals for adjusting the density, size or percentage coverage of each of the pixels with a gamma adjustment related to density development by the apparatus and generates multibit gamma adjusted second data signals. A second look-up table memory generates a third signal related to a characteristic of the recording elements such as for nonuniformity correction. A process look-up table memory is responsive to the gamma adjusted second data signals and the third signals for generating fourth multibit signals relating to exposure on-times for recording pixels by the recording elements. The use of the three look-up table memories results in substantial saving in memory requirements.

20 Claims, 8 Drawing Sheets

NON-IMPACT RECORDING APPARATUS OPERABLE UNDER VARIABLE RECORDING CONDITIONS

CROSS-REFERENCE TO RELATED APPLICATION

This application is related to commonly assigned U.S. application Ser. No. 08/775,789, filed on even date herewith, in the name of the inventor hereof and entitled METHOD AND APPARATUS FOR MULTIPLE ADDRESS RECORDING WITH BRIGHTNESS AND EXPOSURE TIME CONTROL.

BACKGROUND OF THE INVENTION

1. Field of the Invention

The present invention relates to a non-impact recording apparatus and method for recording.

2. Brief Description of the Prior Art

In U.S. Pat. No. 5,255,013, a printhead employing linear arrays of LEDs for recording is described. Light from selective illuminated LEDs impinges upon a photosensitive surface such as a photographic film or electrostatically charged photoconductor to form a latent image. This image may be developed by conventional known means to form a visible image. In forming images that vary in density, it is further known to adjust the size or density of each picture element (pixel) recorded by each LED in steps so that certain pixels may be said to have greater grey levels than other pixels. In recording a grey level pixel, the pixel may be recorded for a single timed duration that varies with a signal representing time duration. See in this regard U.S. Pat. No. 5,586,055, the contents of which are incorporated herein by reference. Another approach disclosed in U.S. Pat. No. 5,255,013 employs a series of rapid flashes to record a single pixel wherein flashes may be either of uniform duration or of varying or binary weighted duration. This can be referred to as multiple address grey level printing since assuming the recording medium is moving relative to the printhead in the in-track direction, the different flashes of light will tend to impinge on slightly different areas of the recording medium; however, the overlap of the various light impingements effectively records a single pixel.

The invention described herein relates to both types of printing.

In order to record a grey level pixel using an LED, multibit exposure data signals need to be generated that are used to control the amount of exposure for each pixel to be recorded by an LED. As noted in U.S. Pat. No. 5,255,013, exposure data signals may be generated by providing a dual look-up table (LUT) set wherein a gray level value data signal is adjusted for nonuniformity of the recording elements and for different process conditions of the recording apparatus. In one of the LUTs an 8-bit word representing uniformity correction or an exposure characteristic of the recording element is provided. Specifically, the uniformity correction LUT represents a grading or binning of the LEDs into say 256 categories according to their respective brightness levels. Thus, where a printhead has a sum of say 7296 LEDs arranged in a row at intervals of 1/600 of an inch, each LED is categorized or associated with a particular bin value from 0–255. Therefore, LEDs which tend to generate about the same light output when driven by the same levels of current are assigned a similar bin value. The second of the dual LUTs is a process LUT which has as its inputs a grey level value data signal, the LEDs bin value and perhaps the color that the recorded image will be developed with. The output of the process LUT is a multibit exposure data signal which may be an 8-bit signal representing exposure value for recording the pixel. The exposure value may be related directly to exposure duration or to a combination of exposure duration and LED intensity. In a printer that is to operate under various very different process conditions it is desirable to provide flexibility to enable accurate rendition of images. The dual LUT approach of the prior art permits some flexibility in that different process conditions due to development with different colors requires very different process conditions. Further, flexibility is also desirable where the gray level signals are defined in different bit depths. For example, the input for one document or image may have a bit depth of 1, i.e. a binary print or no print decision. Other documents or rasterized image data may have respective bit depths of 2, 4 or 8 bits per pixel. Each bit depth needs to be associated with its own process condition in order to provide the best rendition with the given data.

A problem with the dual LUT approach is that for the four color printer case, a process LUT may require four 64K×8 SRAMS of memory to store the exposure data. It is therefore an object of the invention to provide a more economical printer apparatus and method that operates in accordance with more efficient use of memory and thereby reduces the need for extra memory required by the prior art.

SUMMARY OF THE INVENTION

These and other objects and advantages will become obvious after reading the specification below. In accordance with a first aspect of the invention, there is provided a non-impact recording apparatus comprising: a plurality of recording elements; a source of first data signals representing for each of plural pixels density, size or percentage of coverage for recording; a first look-up table memory responsive to the first data signals for adjusting the density, size or percentage coverage of each of the pixels with a gamma adjustment related to density development by the apparatus and generating multibit gamma adjusted second data signals; a second look-up table memory for generating a third signal related to a characteristic of the recording elements; and a process look-up table memory responsive to the gamma adjusted second data signals and the third signals for generating fourth multibit signals relating to exposure on-times for recording pixels by the recording elements.

In accordance with a second aspect of the invention there is in a recording apparatus having a plurality of recording elements for recording images on a recording medium, a non-impact recording method comprising: providing first data signals representing density, size, or percentage of coverage of each of plural pixels for recording; inputting the first data signals as address inputs to a first look-up table memory and adjusting density, size, or percentage of coverage of the pixels with gamma adjustments related to density creation by the apparatus and generating multibit gamma adjusted second data signals; generating third signals related to a characteristic of the recording elements; and inputting the gamma adjusted second data signals and the third signals as address inputs to a look-up table memory and generating fourth multibit signals relating to enablement for recording pixels by the recording elements.

In accordance with a third aspect of the invention there is provided a non-impact recording apparatus comprising: a plurality of recording elements; a source of first data signals representing density, size or percentage coverage of each of plural pixels for recording; a first look-up table memory responsive to the first data signals for adjusting the first signals with an adjustment related to a characteristic of the apparatus and generating second data signals; a second look-up table memory for generating a third multibit signal related to a characteristic of the recording elements; and a third look-up table memory responsive to the second data signals and the third signals for generating fourth multibit data signals to provide recording signals for recording pixels by the recording elements.

DETAILED DESCRIPTION OF THE PREFERRED EMBODIMENTS

Because electrophotographic reproduction apparatus are well known, the present description will be directed in particular to elements forming part of, or cooperating more directly with, the present invention. Apparatus not specifically shown or described herein are selectable from those known in the prior art. The invention, however, is not limited to apparatus for creating images on electrophotographic recording media, as other media such as photographic film, thermal sensitive, etc., may also be used with the invention.

Figure 1:
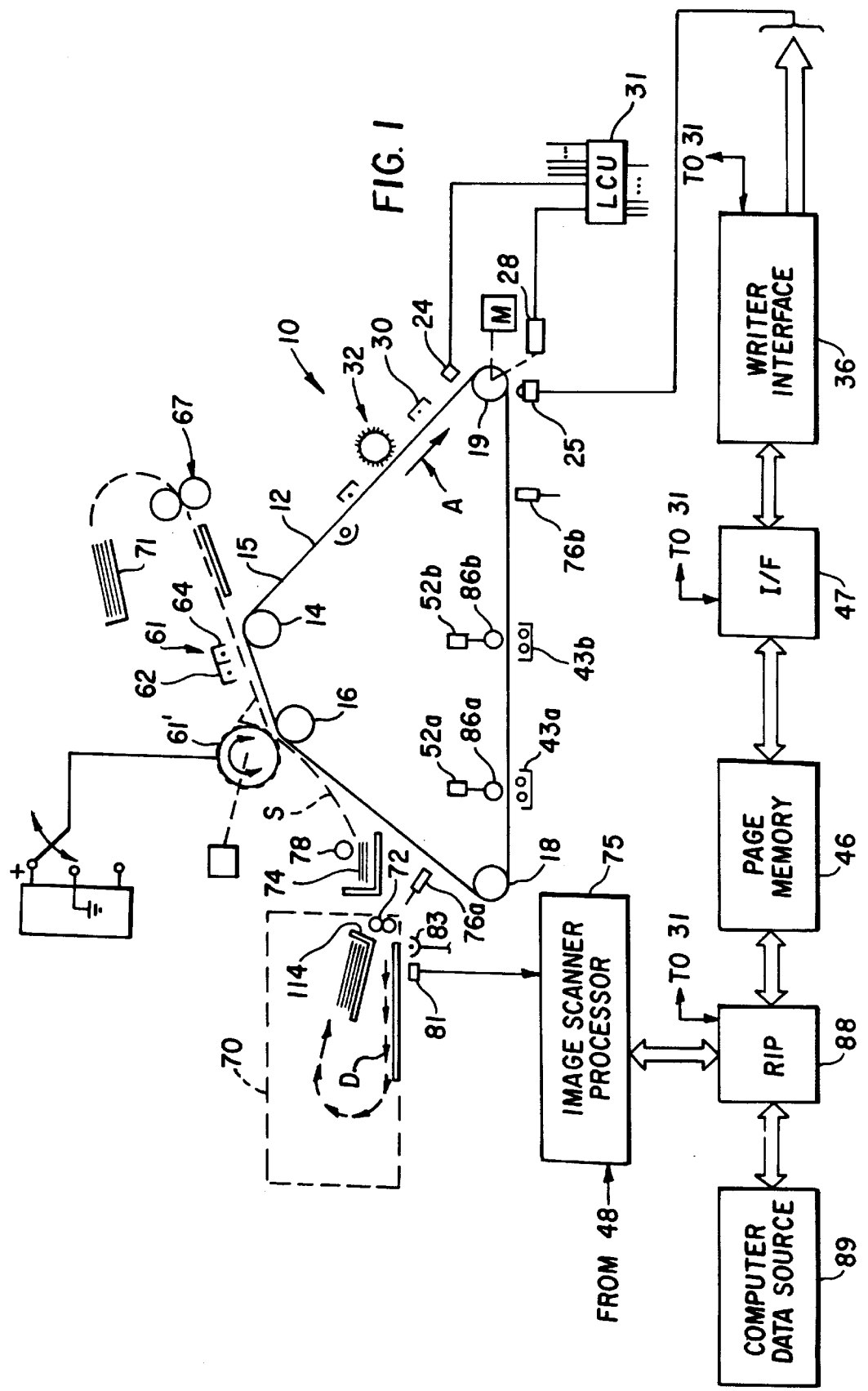
FIG. 1 is a schematic of a grey level printer apparatus made in accordance.

With reference now to FIG. 1, an electrophotographic reproduction apparatus 10 includes a recording medium or photoreceptor such as a photoconductive web 12 or other photosensitive medium that is trained about four transport rollers 14, 16, 18 and 19, thereby forming an endless or continuous web. Roller 19 is coupled to a driver motor M in a conventional manner. Motor M is connected to a source of potential when a switch (not shown) is closed by a logic and control unit (LCU) 31. When the switch is closed, the roller 19 is driven by the motor M and moves the web 12 in a clockwise direction as indicated by arrow A. This movement causes successive image areas or image frames of the web 12 to sequentially pass a series of conventional electrophotographic work stations of the reproduction apparatus.

For the purposes of this disclosure, several work stations are shown along the web's path. These stations will be briefly described.

First, a charging station 30 is provided at which the photoconductive surface 15 of the web 12 is sensitized by applying to such surface a uniform electrostatic primary charge of a predetermined voltage. The output of the charger may be controlled by a grid connected to a programmable power supply (not shown). The supply is, in turn, controlled by the LCU 31 to adjust the voltage level $V_O$ applied onto the surface 15 by the charger 30 through control of electrical potential ($V_{grid}$) to the grid that controls movement of charge from charging wires to the surface of the recording medium.

At an exposure station an electrostatic image is formed by modulating the primary charge on an image area of the photoconductive surface with selective energization of point-like radiation sources or recording elements such as light-emitting diodes (LEDs) or other light or radiation-emitting sources for exposing the recording medium in accordance with signals provided by a data source to be described. The point-like radiation sources are supported in and form a part of a printhead 25 also to be described in more detail below.

First and second development stations 43a, 43b include developer of different respective colors which may consist of iron carrier particles and electroscopic toner particles with an electrostatic charge opposite to that of the latent electrostatic image. Developer is brushed over the photoconductive surface of the web 12 and toner particles adhere to the latent electrostatic image to form a visible toned transferable image. The development stations may be of the magnetic brush type with one or two rollers. Alternatively, the toner particles may have a charge of the same polarity as that of the latent electrostatic image and develop the image in accordance with known reversal development techniques. The apparatus 10 also includes a transfer station 61 shown with a pair of corona chargers 62, 64 at which the toner image on web 12 is transferred in register to a copy sheet S; and a cleaning station 32, at which the photoconductive surface of the web 12 is cleaned of any residual toner particles remaining after the toner images have been transferred. After the transfer of the unfixed toner images to a copy sheet S, such sheet is transported to a heated pressure roller fuser 67 where the image is fixed to the copy sheet S and the sheet is then transported to a tray 71. Suitable means such as a transfer drum 61' may be provided for duplex operation in accordance with known techniques as well as for supporting the receiver sheet while plural color images are superimposed on the receiver sheet to form a multicolor image on one side of the sheet as is well known.

As shown in FIG. 1, a copy sheet S is fed from a supply 74 by driver roller 78, which then urges the sheet to move forward onto the web 12 in alignment with a toner image.

To coordinate operation of the various work stations with movement of the image areas on the web 12 past these stations, the web has a plurality of indicia such as perforations along one of its edges. These perforations generally are spaced equidistantly along the edge of the web 12. At a fixed location along the path of web movement, there is provided suitable encoding means 24 for sensing web perforations. This sensing produces input signals into the LCU 31 which has a digital computer, preferably one or more microprocessors. The LCU has a stored program responsive to the input signals for sequentially actuating, then de-actuating, the work stations as well as for controlling the operation of many other machine functions. Additional encoding means 28 may be provided as known in the art for providing more precise timing signals for control of the various functions of the apparatus 10 as will be described below.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor(s).

Alternatively, the recording medium may be a photoconductive rotating drum with the various stations supported about the drum as is well known. While only two development stations are shown, there may be provided additional development stations for developing different frames of electrostatic images with different colored toners to form multiple color images that may be transferred to a receiver as is also well known. It is known to provide three or four color stations of cyan, magenta, yellow and black to form full process color reproductions and such may be provided in the apparatus of FIG. 1. The invention is also useful in apparatus for forming color images where one or plural printheads are used to record each image frame. Where recording of full process color reproductions is made, it is preferred to use toners having an average volume weighted particle size of about 6 $\mu$m or less.

Figure 2:
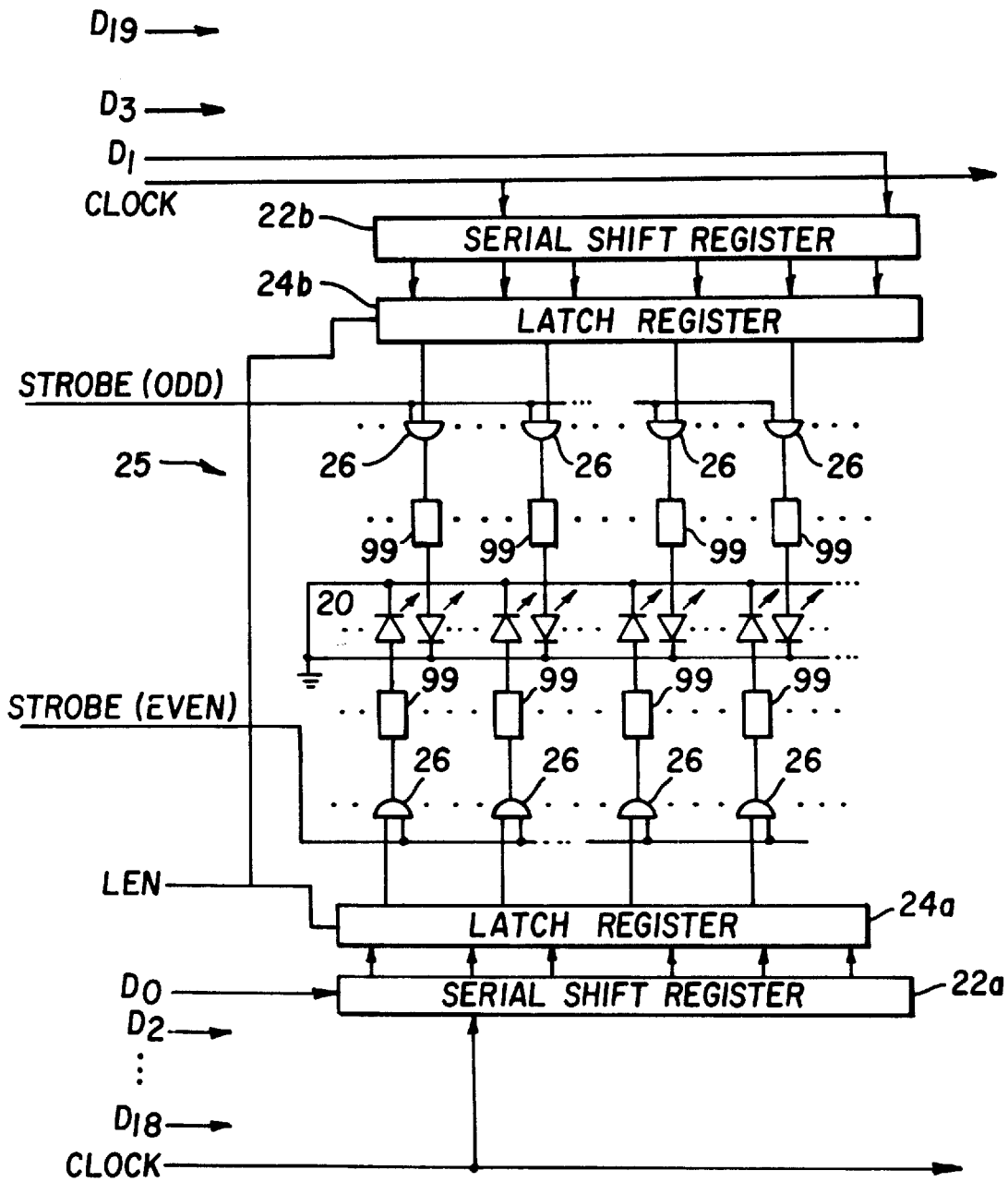
FIGS. 2 and 3 are block diagrams of circuitry of the binary architectured printhead used in the printer apparatus of FIG. 1.

With reference to FIG. 2 and a portion of the printhead 25 is shown. The printhead, as noted, is provided with a multiplicity of energizable point-like radiation sources 20, preferably light-emitting diodes (LEDs). Optical means (not shown) may be provided for focusing light from each of the LEDs onto the photoconductive surface. The optical means preferably comprises an array of optical fibers such as sold under the name Selfoc, a trademark for a gradient index lens array sold by Nippon Sheet Glass, Limited. Due to the focusing power of the optical means, light from a row of emitters will be imaged on a respective transverse line on the recording medium.

Figure 3:
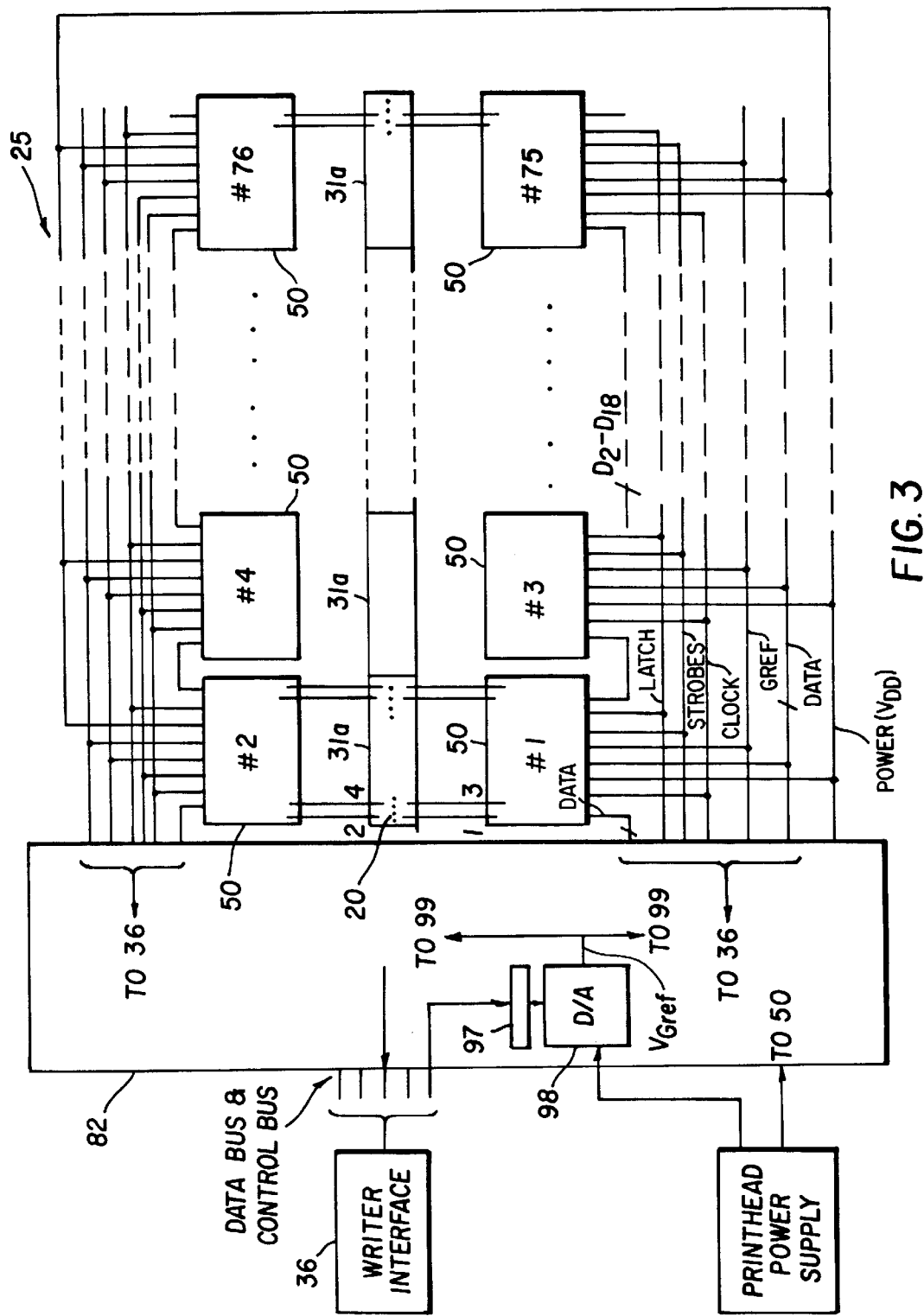

With reference also now to FIG. 3, the printhead 25 comprises a suitable stationary support with a series of LED chip arrays 31a mounted thereon. As is well known, each of the LED chip arrays includes, for example, 192 LEDs arranged in a single row. These chip arrays are also arranged end-to-end in a row and where 38 LED chip arrays are so arranged, the printhead will extend across the width of the web 12 and include 7296 LEDs arranged in a single row at a pitch of 600 dots per inch. To each side of this row of LEDs there may be provided, for example, thirty-eight identical driver chips 50. Each of these driver chips include circuitry for addressing the logic 26 associated with each of 96 LEDs to control whether or not each of the LEDs should be energized as well as current driver circuitry 99 to control the level of current to each of the LEDs controlled by that driver chip. Two driver chips are thus associated with each LED chip array. Each of the two driver chips will be coupled for driving of alternate LEDs, i.e., one of the driver chips will drive the even numbered LEDs and the other driver chip will drive the odd numbered LEDs in a particular LED chip array. Thus, one driver chip will drive the 96 odd numbered LEDs of the 192 LEDs in the array and the other driver chip will drive the 96 even numbered LEDs of these 192 LEDs. Only some of the LEDs are illustrated in FIG. 3, it being understood that many more LEDs are present. The driver chips on each side of the printhead are suitably coupled together in groups to serially shift data between those in a group. Thus, shift register 22a represents the combination of the shift registers in plural driver chips that drive LEDs on plural LED chip arrays. For example, there may be 20 image data lines going to the printhead each carrying binary data to a respective group of driver chips that are connected to form a single serial shift register. Thus, in such an example, three or four odd driver chips, for example, may be connected together to receive binary data serially from a single data line. As is well known, the more data lines provided, the faster the data can be loaded onto the printhead. In the description provided below illustration will be made of only two data lines Do and D1 which represent even and odd data lines for a representative group of LED chip arrays. The operation of the other groups (supported by data lines $D_2$–$D_{19}$) are similar and simultaneous since the data lines to the printhead are operated in parallel. The printhead may also include a connector board 82 for receiving various signals from a writer interface to be described and for receiving power and other signals for powering the printhead.

As may be noted in FIG. 1, the original document sheet D forms a part of a multisheet document supported in a recirculating feeder tray 70. A vacuum drive roller (not shown) under control of the LCU feeds the document D face down through metering rollers 72 which are adapted to feed the document D past an image scanning head 81 formed of say a conventional CCD array and provide signals to a conventional image scanner processor and buffer indicative of the movement of the sheet. A lamp 83 provides a narrow line of illumination, upon the document D and reflections thereof off the document D are sensed by the image scanning array to provide signals indicative of density information thereon. This output of the image scanner array is fed to the image scanner processor and buffer 75 wherein the data is thresholded or rendered.

The image processor processes this data and formats same in accordance with well known techniques and the output thereof is fed via a raster image processor 88 over to a page memory 46 wherein a page of rasterized data to be printed is stored. The raster image processor 88 also rasterizes data from a data source 89 for generating electrical image data signals such as a computer, a document scanner, a memory, a data network, facsimile, word processor, data reader, etc. The printhead in addition to recording image information is also adapted to record process control patches that are recorded usually in an interframe between recorded images for testing to determine a need to adjust process control parameters. In order to form patches with density, the data source or RIP may be provided with memory representing data for creation of a patch. Travel of belt 12 brings the areas bearing the electrostatic latent images into a development area. The development area may have one or more magnetic brush development stations 43a, 43b. Each station has a magnetic brush in juxtaposition to, but spaced from, the travel path of the belt. Magnetic brush development stations are well known. For example, see U.S. Pat. No. 4,473,029 to Fritz et al and U.S. Pat. No. 4,546,060 to Miskinis et al. The two stations 43a, 43b are provided to selectively provide respective different color toners for development of recorded images on the belt 12.

The LCU 31 selectively activates the appropriate development station in relation to the passage of the image areas containing latent images to selectively bring the magnetic brush into engagement with or a small spacing from the belt. The charged toner particles of the engaged magnetic brush are attracted imagewise to the latent image pattern to develop the pattern. Actuators 52a, 86a and 52b, 86b are associated with stations 43a, 43b, respectively. Other types of controls may also be used.

As is well understood in the art, conductive portions of the development station, such as conductive applicator cylinders, act as electrodes. The electrodes are connected to a variable supply of D.C. potential $V_B$ regulated by a programmable controller (not shown). Details regarding the development station are provided as an example, but are not essential to the invention.

Process control strategies generally utilize various sensors to provide real-time control of the electrostatographic process and to provide "constant" image quality output from the user's perspective.

One such sensor may be a densitometer 76a to monitor development of test patches in non-image areas of photoconductive belt 12, as is well known in the art. The densitometer is intended to insure that the transmittance or reflectance of a toned patch on the belt is maintained. The densitometer may consist of an infrared LED which shines through the belt or is reflected by the belt onto a photodiode. The photodiode generates a voltage proportional to the amount of light received. This voltage is compared to the voltage generated due to transmittance or reflectance of a bare patch, to give a signal representative of an estimate of toned density. This signal $D_{out}$ furnished to the LCU is transmitted to the LCU and may be used by the LCU in accordance with a program stored therein to adjust $V_0$, $E_0$, or $V_B$. In addition to measuring density, an electrometer 76b may be provided to measure the charge remaining after exposure but prior to development of the patch. The measured charge signal is also provided to the LCU for use in adjustment of the various process control parameters.

The density signal $D_{out}$ may be used to detect short term changes in density of a measured patch to control primary voltage $V_0$, $E_0$ and/or $V_B$. To do this, $D_{out}$ is compared with a set point density value or signal D(SP) and differences between $D_{out}$ and D(SP) cause the LCU to change settings of $V_{grid}$ on charging station 30 or adjust exposure $E_o$ through modifying exposure for recording a pixel and/or adjustment to the potentials $V_B$ at the two development stations. These changes are in accordance with values stored in the LCU memory, for example, as a look-up table. In accordance with the invention, changes required for operation of the printhead exposure parameters are provided in an efficient way to minimize delays in printing.

In response to pulses from encoders 24 and 28 identifying a new image frame on a photosensitive web, the LCU provides an output signal to the Page Memory to remove one line of data in response to a signal from an interface 47. This data is fed to a writer interface device 36 that includes circuitry for formatting the data and synchronizing the sending of data to the printhead.

Figure 4:
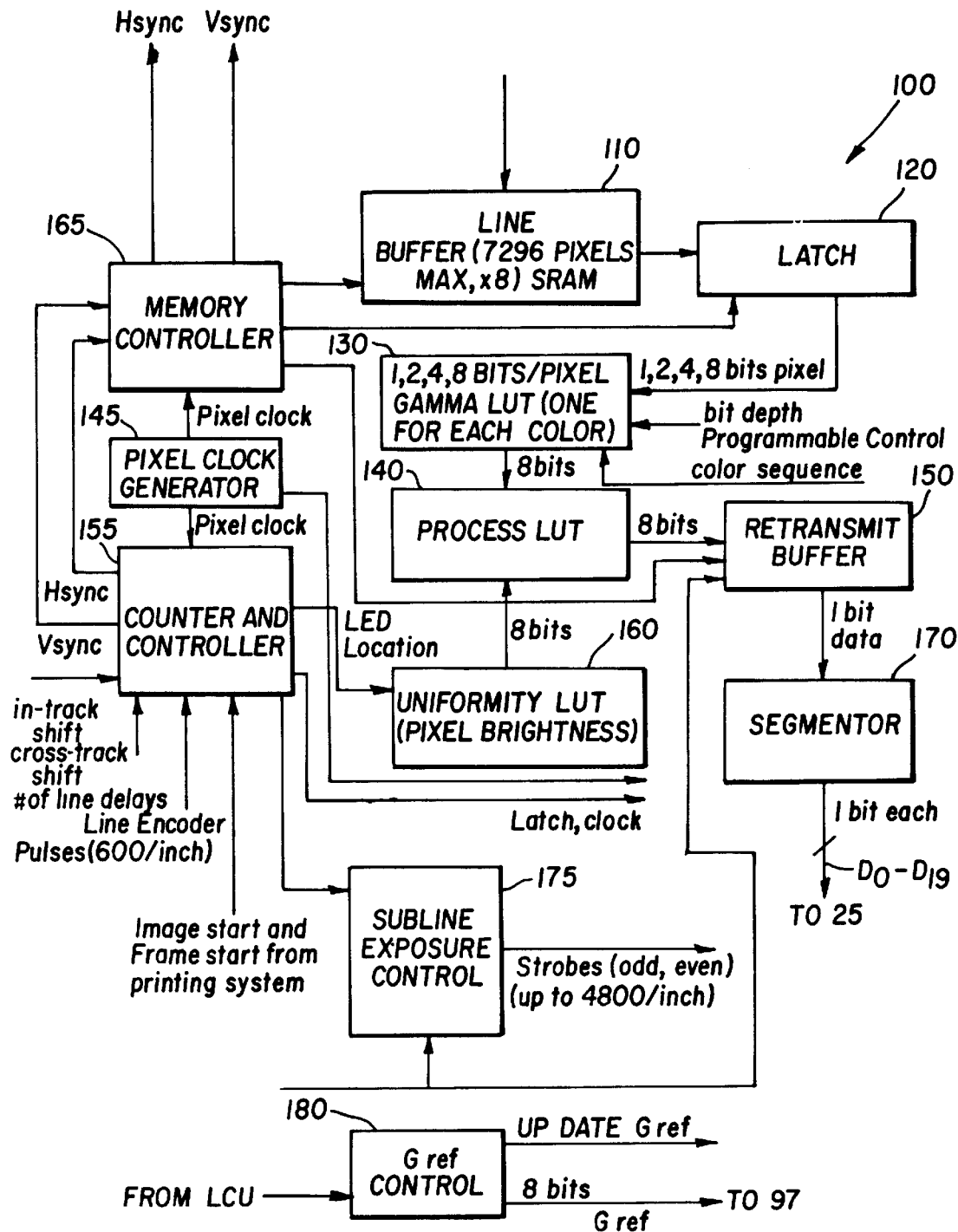
FIG. 4 is a block diagram of a writer interface circuit for formatting data to the printhead of FIGS. 2 and 3 for operation in accordance with the invention.

With reference now to FIGS. 1 and 4, the LCU is programmed to provide signals to the interface 47 to remove rasterized data from the page memory 46 by "pulling" 16-bit words at a time representing grey level data for two pixels where each corrected pixel data is represented by 8-bits per pixel. The printhead is also operable in other operating modes or bit-depths such as 1, 2 or 4-bits per pixel in accordance with a signal from the LCU. In such case, the 16 bits which are read from page memory 46 at say a rate of 16 MHz represent 16, 8 or 4 pixels respectively for printing lines nominally at 600 lines/inch. The invention will be discussed with reference to the example of exposure data for a pixel to be printed being represented by 8 bits/pixel but, however, the invention is applicable to other bit-depths. Thus, even though the rasterized pixels in the framestore or page memory are 1, 2, 4 or 8 bits/pixel, after correction the exposure data for each pixel will be 8 bits.

The data from the single or multipage page memory 46 or framestore is input to a line buffer 110 which may be an SRAM that stores a line of data (7296 pixels at 8 bits/pixel).

Figure 6:
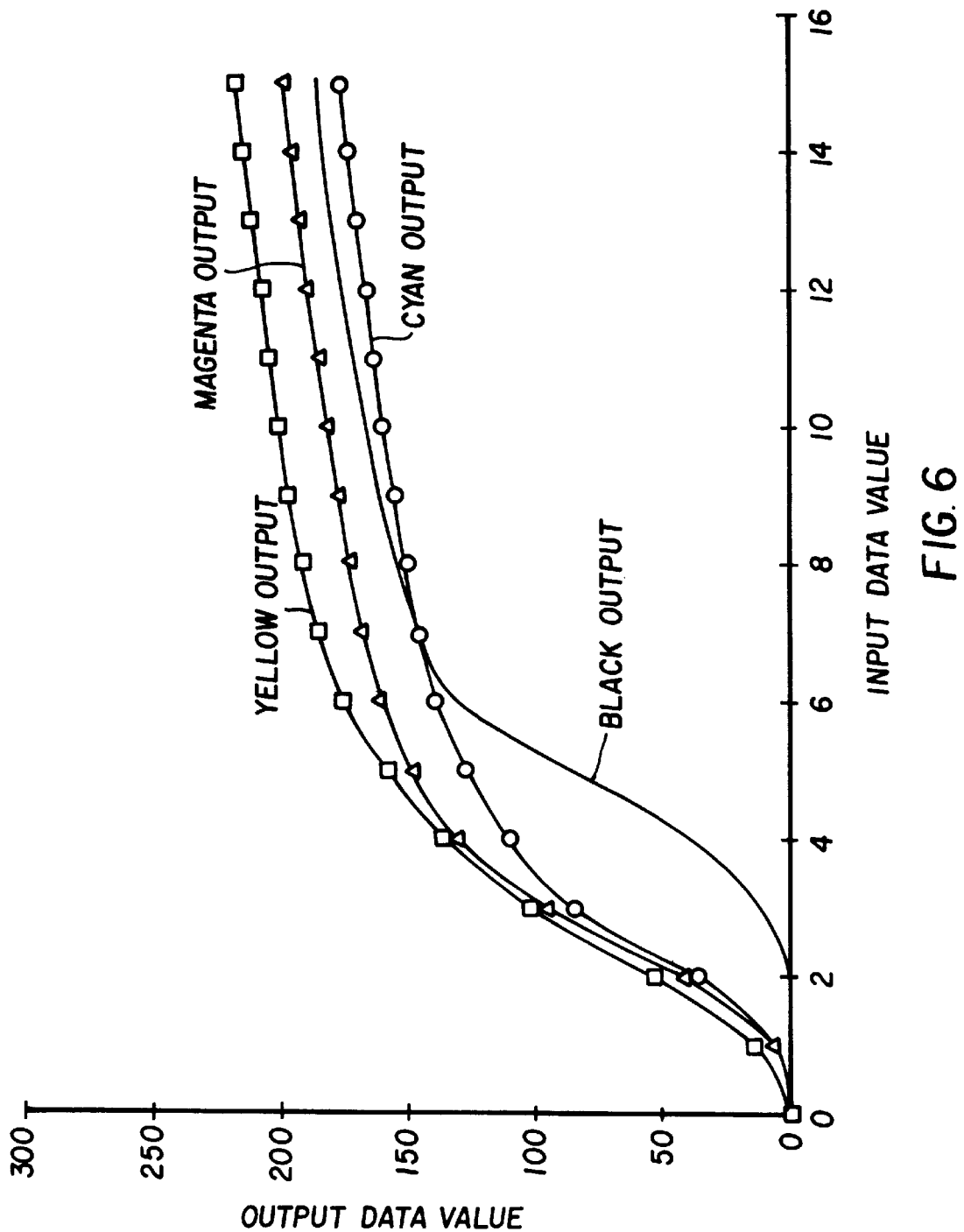
FIG. 6 is an illustrative example of an input data value-output data value relationship for a gamma look-up table (LUT) in a color electrophotographic recording apparatus of the type illustrated in FIG. 1 for the case of a 4 bits per pixel input data value.
Figure 7:
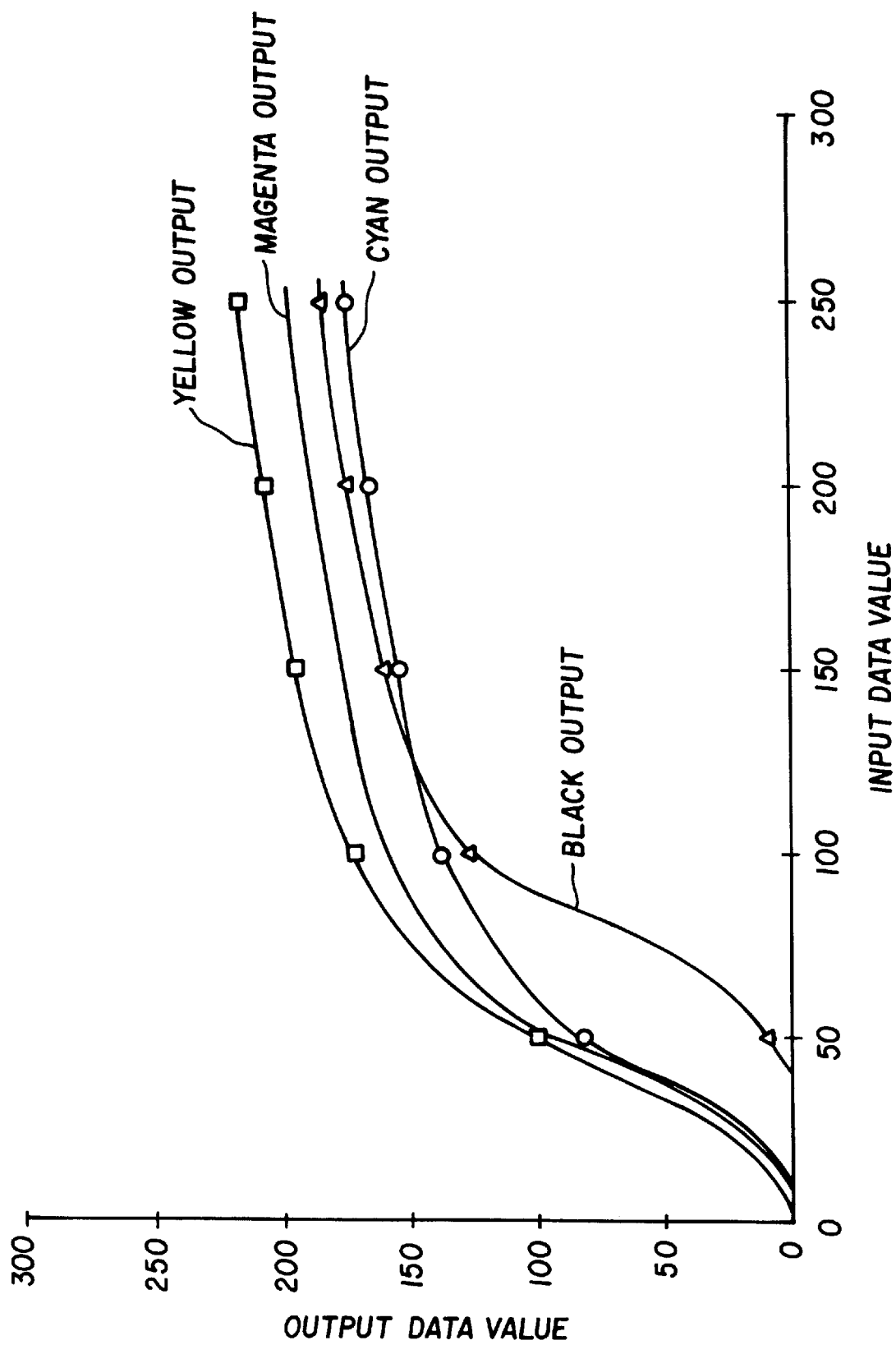
FIG. 7 is another illustrative example for a gamma LUT as indicated for FIG. 6 but for an 8 bits per pixel input data value case.

When a full line of image data is stored in line buffer 110, a byte of data (8 bits) representing grey level data for one pixel is parallel clocked out (a byte at a time) to latch 120. This grey level data is then output from latch 120 and input as part of an address input to a gamma correction look-up table memory (LUT) 130 which also receives from say the LCU as address inputs signals representing bit-depth and color sequence. The color sequence signal is a digital signal identifying the color of the image that the current line of image data or frame of image data pertains. In a process color printer with four color stations, the color frames may be cyan, magenta, yellow and black. Each color preferably has its own gamma correction LUT for each of the selected bit-depths of input data. Once the bit-depth for printing is selected, software may be provided in the LCU to load the gamma LUTs of that bit depth to the cyan, magenta, yellow and black gamma correction table values. The output of the gamma correction LUT is an 8-bit value which is thus a modification of the input value in accordance with characteristics of the print system. The LUTs may be formed in a 4k×8 SRAM. The output of the gamma correction LUT in response to the above inputs is an 8-bit signal value representing a gamma-corrected signal for the particular pixel data value that is input to a process LUT 140. Illustrative examples of the input data value versus output data value for gamma LUTs of a 4-bit input data value and an 8-bit input data value are provided in FIGS. 6 and 7 respectively. These graphs show typical relationships for gamma correction for a print system. The data in the gamma LUT may also be specific for type of image being recorded such as halftone, contone which is particularly useful in the case of an electronic copier. In such a case the operator of the copier may designate an input image type by pressing a button on the operator control panel and in response to an image type signal the LCU downloads to the gamma LUT data for such an image type. Alternatively, as is known, the type of image may be identified automatically from data in the scan operation and the processor 75 or RIP generates the image type signal to the LCU.

Figure 8:
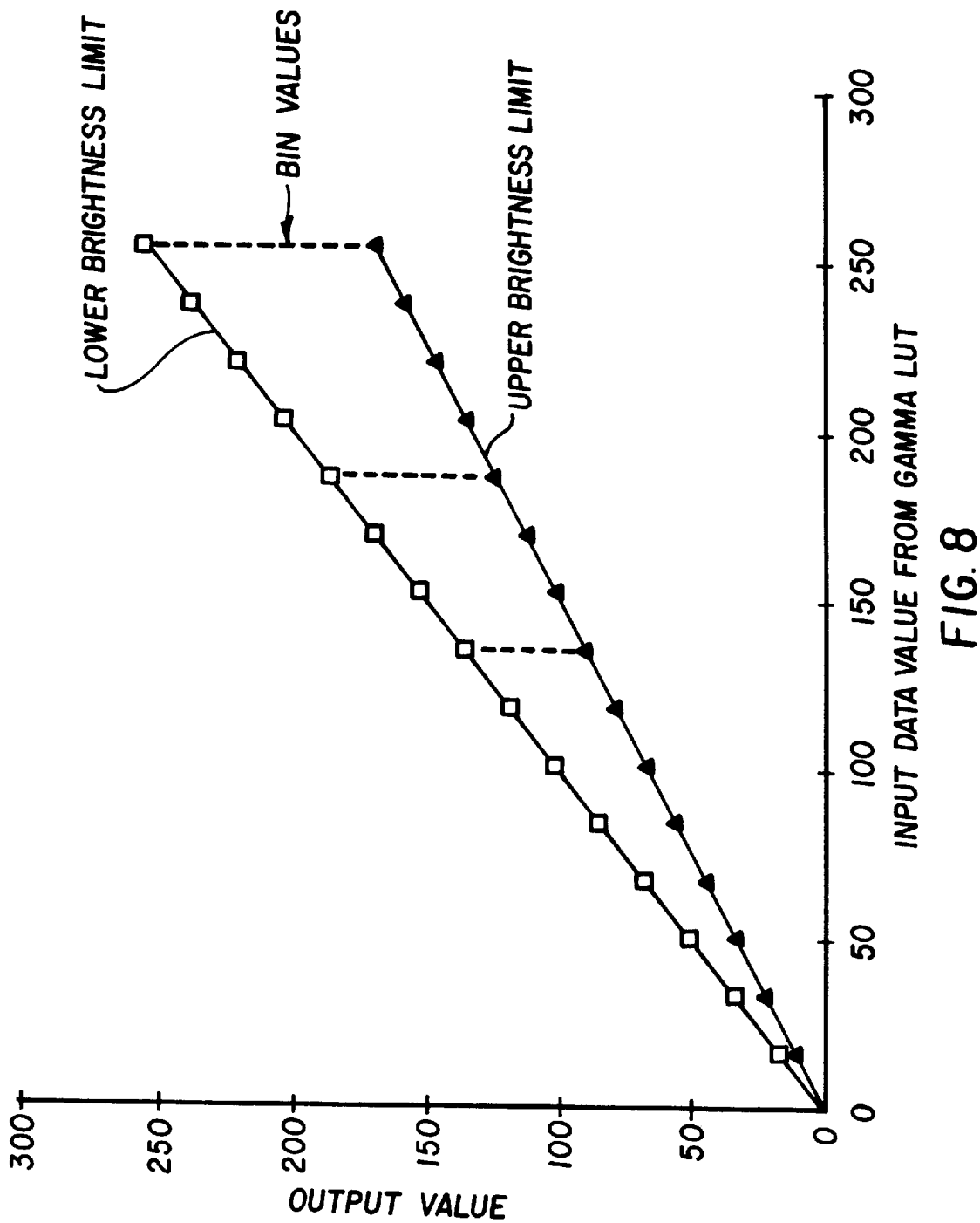
FIG. 8 is an illustrative example of an input data value, bin value output data value relationship for a process LUT in a color electrophotographic recording apparatus of the type illustrated in FIG. 1 for the case of 8 output exposure values.

The process LUT memory has 16-bits address space and it holds 8-bits data in each of the address locations. It translates the pixel brightness input (from the uniformity LUT) and the gray level input (from the gamma LUT) into exposure data for the retransmission buffer that can be used for printing. This LUT is loaded by software on power-up. An example of data in such a table is illustrated in FIG. 8. The data illustrated assumes a binary weight exposure for the 8-bits per pixel case. The relationship could also be non-linear. The size of the Process LUT is a 64K×8 SRAM. As can be seen, using a Gamma LUT/Process LUT/ Uniformity LUT (tri-LUT approach) as described, provides substantial economies in memory savings over a dual LUT approach wherein the process LUT and gamma LUT are combined as one LUT and receive address inputs from a uniformity LUT memory. In the dual LUT approach four (one for each color) 64K×8 SRAMS may be needed just for the 8-bits per pixel case alone. Where other bit-depths are to be supported, additional 64K×8 SRAMS are needed.

The Uniformity LUT memory 160 contains the binned pixel brightness values (in 8-bit value) for each of the measured LED brightnesses. This may be loaded from software on power-up. The uniformity LUT should be able to hold data for 7296 recording elements. So an 8K×8 SRAM is sufficient to use for this. Although SRAMs are preferred, other RAM-type or read-write memories may also be used.

The uniformity LUT represents a binning of the recording elements whose respective light output (brightness) characteristics are measured and then each recording element is assigned into a respective bin. Recording elements having similar brightness are assigned the same bin value. The bin values, if represented by 8-bit numbers need not be directly related to brightness; e.g., higher bin values do not necessarily imply higher brightness values nor need bins be created using equal increments of brightness. What is necessary is that recording elements having substantially similar brightness characteristics have the same bin number. The process LUT values are programmed to modify the exposure according to the bin number output by the uniformity LUT. Where 8-bits are used to define the bin values, the recording elements are assigned values 0–255. The uniformity LUT receives inputs from a counter and controller 155. The counter 155 in turn receives inputs of pixel clock signals from a pixel clock generator 145 and counts the clock pulses from say 1 to 7296. This count is output to the uniformity LUT as an address and identifies a particular recording element (LED). The recording elements are considered identified by say assigning LED # 1 to be the first LED on one end of the printhead and LED #7296 to be the endmost LED at the other end of the printhead with the numbers of the other LEDs in between assigned accordingly. Details regarding binning of LEDs are known in the prior art and may be found, for example, in U.S. application Ser. No. 08/580,263, filed in the name of Yee S. Ng et al and U.S. Pat. No. 5,586,055, the contents of which are incorporated herein by reference.

The output of the process LUT 140 is an 8-bits per pixel digital data signal representing exposure for a pixel. This 8-bits signal has bits with different weighting value. Typically, binary weighting is preferred so that one bit is a most significant bit (MSB), another bit is a least significant bit and the other 6 bits are accordingly weighted. The 8-bits signal is input to a retransmit buffer 150. The retransmit buffer is used to hold one line (7296 pixels) of data (8-bits) so that one selected bit (say, in this example, the MSB for each pixel) can be sent to the segmentor 170 as a subline of binary data for the printhead. This operation occurs within one subline which may be one of 6, 7 or 8-sublines per main encoder line. For the 6 or 7 sublines cases, the MSBs will be don't cares. Each main encoder line pulse occurs at say 1/600 of an inch travel of the web 12 or about 336 $\mu$s of the operation. Then another selected bit for each pixel can be sent to the segmentor as a line of binary data for the printhead. This operation of retransmission continues until all the selected bits (6, 7 or 8 selected bits chosen by software) are transmitted to the segmentor. Preferably, the selected number of bits is the same for all color frames of the page. Then new data is loaded to the retransmit buffer. The sequence of which bit to choose first in this multiple retransmission process is programmed by software. For a faster running system of lower quality, perhaps 6 sublines for exposure is good enough. But for a slower running system, one can make use of all the 8 sublines exposure for higher quality.

Figure 5:
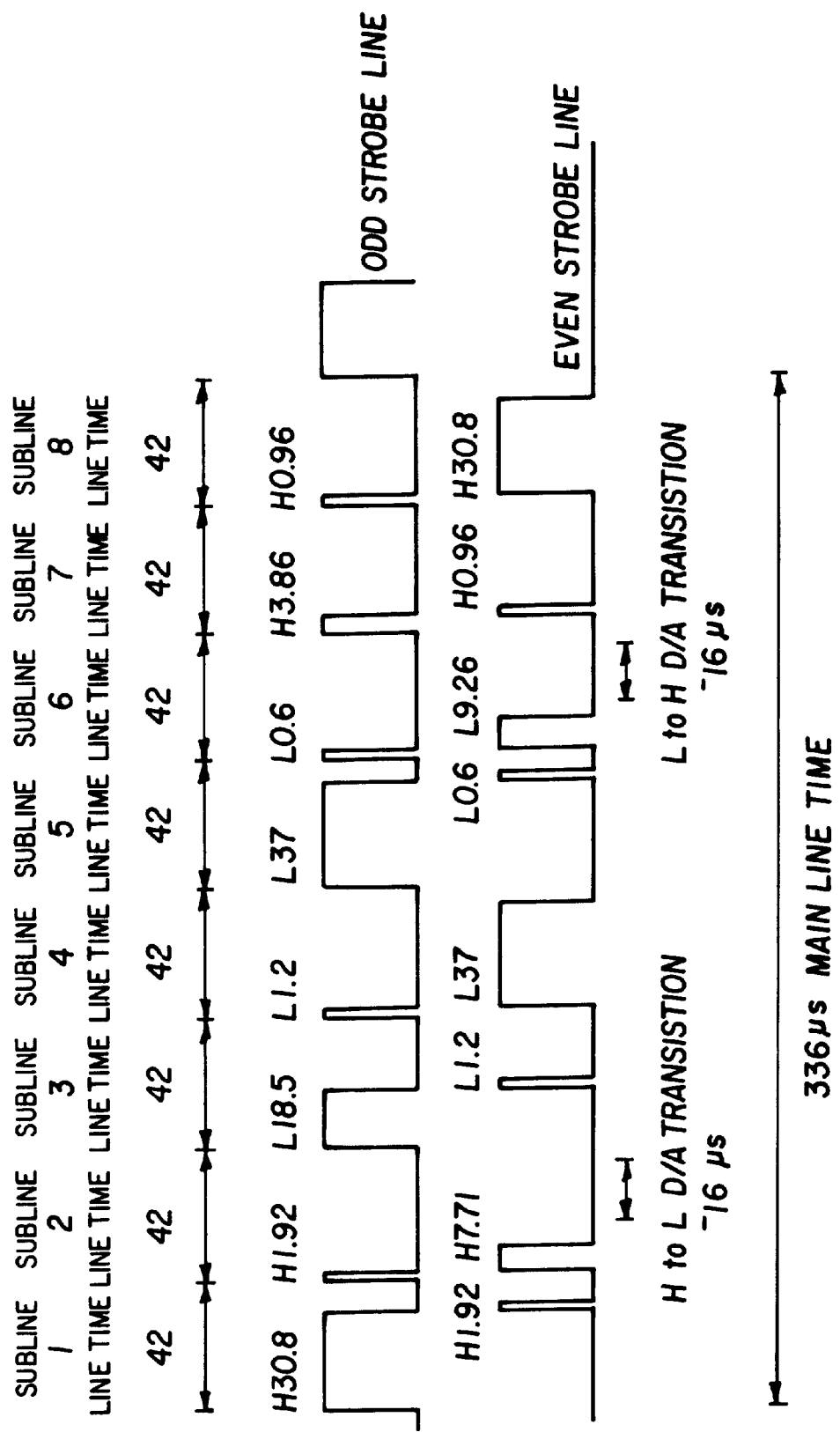
FIG. 5 is a timing diagram illustrating strobe pulse signals on strobelines in a binary architectured printhead which forms a part of the printer apparatus of FIG. 1.

The subline exposure control 175 consists of two separate exposure clocks (strobes) for the odd and even sides of the printhead. The order of the exposure clock pulse trains are programmable, i.e., loaded by software and the start of the pulse train is synchronized with respect to the main encoder pulse as is generally known using $V_{syn}$ and $H_{syn}$ pulses which are synchronizing pulses for the in-track and cross-track direction. This exposure clock pulse train sequence is coincided with the retransmit selected bit sequence and the number of retransmissions (6, 7 or 8 sublines per main line). So a new exposure pulse train needs to be reloaded every time that the retransmit buffer bit sequence or the number of retransmissions changes. There preferably are four separate sets (each set has its own sets of odd and even exposure clock pulse trains) of pulse trains stored on RAM for the four-color frames. The odd and even strobes or exposure clock pulses do not enable exposures at the same time (as pointed out in U.S. Pat. No. 5,255,013) in order to reduce instantaneous current load on the printhead. The exposure clock pulse trains are interrelated with a digital Gref control 180 on a subline basis to provide better dynamic range without errors in exposing the LSBs due to rise time (about 200–400 ns) problem of the LEDs. The Gref control as will be described adjusts driver current to an LED during a subline exposure period. If the line time for the main encoder pulses is 336 $\mu$s, then the subline time is 42 $\mu$s. If the maximum exposure duration per subline is limited to 37 $\mu$s, then for a binary weighted case with 8 sublines there is provided exposure pulse trains for the odd and even side as shown in FIG. 5. In this case, Gref for all the sublines are the same for one color frame. Gref can be different for different color frames. But the subline exposure for the LSBs are too short (300 ns and 600 ns, respectively) compared with the rise and fall time. So in order to have good non-uniformity correction, a longer pulse width for the LSBs is provided but yet producing an equivalent exposure. Using a lower Gref (digitally controlled) for the LSBs allows the use of a longer pulse width for LSB (least significant bit) exposures to avoid the rise time problem and still provide for the correct exposure. If more than one Gref value is available on a subline exposure basis the exposure dynamic range can be extended in slower speed systems. However, complications may occur due to the settling time (10 $\mu$s, for example) of the D/A converter for the Gref control. Thus timing for change in Gref during a subline is also important. An example of this is shown in FIG. 5 and will be further discussed below.

The segmentor 170 takes the 1-bit data (one line) from the retransmit buffer and segments the data into 20 segments to supply the 20 data line ($D_0$–$D_{19}$) binary printhead. The odd side data is forward loading into the shift register 22b but the even side data is reversed in direction before being sent to the printhead for loading into shift register 22a. This is due to the printhead structure of using one type of driver chip for both the odd and even sides of the printhead and the fact that if data into a shift register segment can only be loaded in one direction; e.g., left to right, then on one side of the printhead data for an even segment is loaded in say an order of LED number (768, . . . 6,4,2) whereas on the opposite side data for an odd segment is loaded (1,3,5 . . . 767). The need to reverse the data may be eliminated by use of bi-directional shift registers.

The control for global brightness of the printhead, i.e. same control signal for all the driver chips 50, can be controlled via driver current control. An 8-bit digital value Gref from the Gref Control 180 to a D/A converter 98 on the printhead interface board 82 is used to control printhead brightness by adjustment of driver current. Each driver chip, as is well known, includes trim adjustments set by the manufacturer of the printhead to provide the group of LEDs driven by that driver chip with currents providing average normal brightness. There should be two Gref values available for each color frame (so a total of 8 Gref values) that can be stored in the Gref controller 180 and loadable via software and be used. Thus, different Gref values (two choices for each color) may be used. Which sublines within a main line to which a particular Gref value is used is programmable. The sequence choice of Gref should be repeatable for the sublines within main lines of a color frame. This Gref or intensity sequence coincides with the sequence of which selected bit to transmit in the retransmit buffer as well as the subline exposure control sequence. The digital 8-bit Gref values are output to a register 97 associated with D/A converter 98. The Gref values are then latched in the converter 98 in response to a latch or update signal provided by $V_{Gref}$ control 180 to cause a new analog voltage signal $V_{Gref}$ to be provided to all the driver chips. This voltage signal affects current level to each of the LEDs that become enabled as will be described.

Memory controller 165 in response to signals from the controller 155 output $V_{sync}$ and $H_{sync}$ to the framestore to request for data. The $V_{sync}$ signal signifies frame start and the $H_{sync}$ signal signifies line start. The framesize (number of lines per frame), number of lines delay from engine start of page signal and what color frame to use are programmable by software and are conventional signals used in printer apparatus. The controller 155 receives from the marking engine LCU various synchronizing signals as is well known such as start of page and main encoder line pulses. In response to such signals, there are generated data clock, latch, strobes and data signals to the printhead. In order to improve signal integrity to the printhead, it is preferred to use differential drivers for the data, strobes data clock and latch lines to the printhead. This, as is well known, minimizes the effects of noise on these signals. Other signals such as top and left margin controls are provided via registers programmable from host software. Image width (cross-track) is fixed at 7296 pixels. Image length (in-track) is controlled by a signal from the framestore interface 47 which controls the number of main scan lines in an image frame which is related to the receiver sheet size in the in-track direction.

With reference to FIG. 5, a set of strobe or exposure clocking pulses is illustrated for each of the even-numbered LEDs and the odd-numbered LEDs. Assume that a mainscan line represents a movement of 1/600 of an inch of the image recording belt or web. Thus mainscan line encoder pulses are generated at every 1/600 movement of an inch which is assumed at a certain nominal specified web speed to typically provide encoder pulses nominally spaced in time at 336 µs. The 336 µs time period is divided into eight equal timed subline time periods of 42 µs each. Considering the eight subline exposure clock pulses for the odd-numbered LEDs shown, these are labelled as follows: H 30.8, H 1.92, L 18.5, L 1.2, L 37, L 0.6, H 3.86, H0.96. The letter "H" denotes that a voltage $V_{Gref}$ signal from the D/A converter 98 for each current driver to the odd LEDs for this subline will provide a relatively high level current that gives a brightness of say 1.2× of nominal. The letter "L" denotes a relatively low level of current will be driven by the drivers, to provide a nominal brightness of 0.5×. Thus, the average level of brightness of the LEDs during an "H" labelled subline will be about 2.4× that during an "L" labelled subline. Note that during a subline exposure period all odd numbered LEDs on the entire printhead will be the subject to exposure using the noted exposure clock or strobe pulse for that particular LED for that particular subline assuming, of course, that the pixel data for that particular LED for that particular subline has a data bit calling for an exposure. The following example will explain this. Assume that an 8-bit corrected exposure data signal is decimal 115 of a possible maximum exposure value of 255. The value 115 in binary weighted terms is 01110011 wherein the most significant bit (MSB) is stated first and the least significant bit (LSB) is stated last and the binary weighting of the remaining bits follows a descending order. The retransmit buffer 150 when it receives this 8-bit signal for a particular odd-numbered LED transmits the bits via the segmentor to the printhead in a different order 7, 3, 5, 1, 6, 0, 4, 2 wherein 7 is the MSB, 0 is the LSB, 6 is MSB-1 and so on. In this example given the order of the subline pixel data for this particular odd-numbered LED exposure data is reordered to 00111110. Thus, in this example, for the odd-numbered LEDs, data will be sent to the printhead so that the MSB is sent first. The reasons for the reordering is as noted in U.S. Pat. No. 5,255,013 to limit printer current to the printhead during a subline recording and to minimize heat buildup on the printhead. Thus, as can be seen in a nominal 42 µs subline exposure period a relatively long pulse for say the odd-numbered LEDs occurs and is followed or preceded by a relatively short duration exposure pulse for the even numbered LEDs or vice versa. The reason for this is that it is desirable not to have the even-numbered and odd-numbered LEDs be on at the same time. With that as a constraint you cannot have long subline exposure on-times for both the odd- and even-numbered LEDs during one of the 42 µs time periods. It is preferred that if one is long that the other be short to minimize heat buildup at adjacent LED sites. Additionally, there is a factor of Gref setting which determines level of current during each subline exposure. Thus, Gref level is also to be considered vis-à-vis tendency for heat buildup. Further to be considered is a desirability that for any particular LED that the arrangement of subline exposures alternate between high and low subline heat-producing exposure to that LED to minimize heat buildup at the LED site since elevated temperature can adversely affect LED light output. An exposure is the product of pulsewidth duration for the subline exposure and brightness for that subline exposure and heat production is related to the product of pulse width and current. Still another factor to be considered is the allowance of suitable transition time between sublines wherein $V_{Gref}$ is changed from high to low or low to high. As noted above, assume at least 10 µs (applicable for some DACs, other DACs may have faster settling times but if belt speeds are faster and hence subline exposure speeds are shorter the problem is analogous) is minimally required to provide for a stable D/A converter (DAC) transition and the apparatus provides for a 16 µs transition period as shown in FIG. 5 wherein during subline exposure period #2, two short exposure durations are provided for the even and odd strobe lines so that at least a 16 µs period is available for a high to low transition of the DAC before the next subline exposure is set to start for subline exposure period #3. A similar time reservation is provided in subline #6 to permit transitioning between low to high DAC $V_{Gref}$ transitions. Note that while the example shows that the DAC transitions for both odd and even drivers are the same such need not be the case. That is the driver chips driving the odd-numbered LEDs may transition from low to high driving currents while the even numbered LEDs transition from high to low driving currents and vice versa for the later transition or the transitions may be at different times. For the example shown in FIG. 5, the sequences of the 8-bit corrected exposure data to each of the even-numbered LEDs is 3, 5, 1, 6, 0, 4, 2, 7 with 7 being the MSB and 0 the LSB and the others sequenced accordingly where numerical value equates with order of binary weighting of a bit as described above. Thus, in this example the MSBs for all the even-numbered LEDs will be exposed during subline #8. The LSBs will be exposed during subline #5. To ensure accurate exposure for the gray level pixel, the exposure time for the LSB is relatively increased in duration than what it should normally be but the current level during the subline #5 is relatively low so that the product of brightness and time which equates with light output during exposure is accurate for the LSB's exposure. It may be seen that other bits may also be exposed using the lower current level and their exposures are accordingly increased.

In operation the retransmit buffer selects the appropriate bit for output to the printhead for each subline in accordance with the programmed subline ordering for odd, even LEDs accordingly. The appropriate bits for all the odd LEDs and for all the even LEDs are respectively output to the segmentor 170. The segmentor merely orders the data bits for a particular subline to one of the printer data output lines $D_0$–$D_{19}$ with rearrangement as noted above for front loading or backloading if needed. Circuits for reordering data are well known and such function may be done by a computer controlled device also. The operation of a binary architectured printhead is such that a respective latch register 24a, 24b stores data for a particular weighted binary bit for each of the LEDs supported by that respective register during one subline exposure period used for enabling the LEDs in accordance with the respective bits. During such exposure, exposure data bits to be used during the next subline exposure period are sent to the respective serial shift registers 22a, 22b. A latch enable signal (LEN) is provided by the controller 155 to latch data from the shift registers 22a, 22b to the respective latch registers 24a, 24b. The Gref control 180 outputs to register 97 an 8-bit control signal representing current level for the D/A converter 98. The D/A converter may be a current mirror that is digitally controlled and well known in the art. For example, the D/A converters may receive an update Gref signal from the Gref control 180 which then causes the D/A converter to transition from one current output level to another, i.e., low to high or high to low based on the 8-bit digital signal in the register 97. Typically, a current mirror may operate by generating a current in a master circuit that is replicated or bears some relationship to currents caused to be driven in slave circuits. The slave circuits may be in drivers 99 that are associated with each LED and respond to a voltage signal $V_{Gref}$ in a line output by the D/A converters wherein the voltage signal is generated in response to the level of current in the master circuit, see, for example, U.S. Pat. No. 5,389,953. The currents in each slave circuit are enabled in accordance with enablement of logic gates 26 which respond to an exposure clock pulse on the respective strobe line and the presence of an exposure data bit associated with that LED for that subline.

The invention has been illustrated with regard to a printhead having a plural number N of point-like recording elements (LEDs) per inch exemplified by the N=600 dpi printhead described herein and a control for exposing M lines (M=600 dpi) of grey level pixels per inch in the sub-scanning direction by use of L sublines, exemplified by L=8, for each grey level pixel. Thus, subline encoder signals are provided at the rate of 1/4800 per inch of travel of the web 12 for recording P=L×M (4800 in this example) sublines per inch.

The exposure durations during the sublines for recording a grey level pixel are mixed between large and then followed by relatively shorter duration exposures which contribute to electrophotographic process stability. Thermal problems are minimized by reducing current requirements to the printhead through staggering of the enablement times during each subline exposure period. The duration of each subline exposure period is kept uniform to simplify the clocking of data to the printhead yet the duration of each subline exposure period is of relatively short duration. The advantages of grey level printing using an inexpensive binary printhead are thus inexpensively and efficiently realized.

The specific exposure times and resolution dimensions identified numerically are provided as exemplary and, of course, may be optimized for the appropriate printhead. Exposure correction to compensate for non-uniformities in the LEDs or drivers is accomplished through modifying of data for each LED at each grey level. The advantages of process stability are attained even where the exposures for the sublines are concurrent.

Accurate exposures of grey level pixels are thus obtained using the apparatus since accuracy of exposure of the LSBs is emphasized by allowing for increased exposure times for the LSBs at least for a period sufficient to minimize error due to time related responsiveness of the recording elements. Additionally, memory may be saved particularly where multiple bit depth exposures and/or a plural color system is provided by use of the tri LUT approach wherein a gamma correction LUT and a non-uniformity correction LUT provide respective outputs as addresses to a process LUT which generates exposure data that is used to determine exposures for the subpixels.

While the invention has been illustrated in connection with an electrophotographic apparatus using LEDs, lasers or other exposure devices, other non-impact dot matrix printers such as ink jet, thermal, electrographic, photographic, etc. may also make use of the invention described herein.

While data output from the framestore is described as related to density or size of a dot it may also reflect as is known in the art a signal related to percentage of coverage. The first LUT need not be a gamma LUT as it may modify an input signal related to density or size or percentage of coverage by a pixel with a characteristic(s) of the print system. For example, in an ink jet system the parameter might be the type of paper the drops are printed on since different paper types can provide differences in resulting image. In electrophotographic systems changes in humidity which are typical of seasonal changes in the environment affect charge to mass ratios which can be corrected for by use of different gamma correction tables in accordance with humidity. Thus, broadly, it will be seen that the first LUT takes a data input value related to density or size of dot or percentage of coverage and modifies the data input value in accordance with characteristics of the print system to provide a modified data value for input into the process LUT. The process LUT then in response to the modified data value in conjunction with a value related to a characteristic of the printhead or recording element outputs an output signal to the printhead to create a dot or pixel of appropriate density, size or percentage of coverage. Such output signal may determine an exposure or exposure parameter where the system relies on light or other radiation such as heat (thermal systems) for forming images or it could be frequencies of pulses sent to a piezoelectric ink-jet device, or number of drops to other ink-jet devices.

The encoder means may be of the type described herein, wherein each line of printing is "tracked" relative to actual photoconductor movement or wherein an encoder signal is "tracked" at the beginning of each frame and pulses artificially created for each line in accordance with approximate photoconductor movement.

The invention has been described in detail with particular reference to preferred embodiments thereof, but it will be understood that variations and modifications can be effected within the spirit and scope of the invention.

What is claimed is:

1. A non-impact recording apparatus comprising:
   a plurality of recording elements;
   a source of first data signals representing for each of plural pixels at a predetermined pixel bit depth, a density, size or percentage of coverage for recording each of the pixels;
   a first look-up table memory that stores multibit gamma adjustment data pertinent to the predetermined pixel bit depth and is responsive to the first data signals for adjusting the density, size or percentage coverage of each of the pixels with a gamma adjustment related to development by the apparatus and generating multibit gamma adjusted second data signals;

a second look-up table memory for generating third signals related to uniformity correction of the recording elements;

a process look-up table memory having as inputs thereto the gamma adjusted second data signals and the third signals and generating in response to the inputs fourth multibit signals relating to exposure on-times for recording pixels by the recording elements; and a control for loading multibit gamma adjustment data into said first look-up table memory, the control being operational with different predetermined pixel bit depth modes of the first data signals to load the first look-up table memory with gamma adjustment data corresponding to the pixel bit depth of the first data signals.

2. The apparatus of claim 1 wherein the first look-up table memory provides for gamma adjustment of data for each of plural colors used for developing a multicolor image.

3. The apparatus of claim 2 wherein the control is programmed to provide the first look-up table memory to receive gamma adjustment data in accordance with each of 1, 2, 4 or 8 bits per pixel pixel bit depths of the first data signals.

4. The apparatus of claim 3 wherein the fourth multibit signals are defined by 8 bits per pixel for each of 1, 2, 4 or 8 bits per pixel pixel bit depths of the first data signals.

5. The apparatus of claim 4 wherein the second look-up table memory provides a same valued third multibit signal for recording elements having similar brightness characteristics.

6. The apparatus of claim 1 wherein a driver drives current to a recording element during each of plural sub-pixel intervals and durations of on-time of the recording elements are different during at least some of the intervals.

7. In a recording apparatus having a plurality of recording elements for recording images on a recording medium, a non-impact recording method comprising:

providing first data signals, at a predetermined pixel bit depth, representing density, size or percentage of coverage of each of plural pixels for recording;

inputting the first data signals as address inputs to a first look-up table memory and adjusting density, size or percentage of coverage of the pixels with gamma adjustments and generating multibit gamma adjusted second data signals;

generating third signals related to a characteristic of the recording elements;

inputting the gamma adjusted second data signals and the third signals as address inputs to a look-up table memory and generating fourth multibit signals relating to enablement for recording pixels by the recording elements; and loading different multibit gamma adjustment data into said first look-up table memory for respective different operational modes of the apparatus defined by different predetermined bits per pixel pixel bit depth of the first data signals.

8. The method of claim 7 wherein the first look-up table memory provides for gamma adjustment of data for each of plural colors used for developing a multicolor image.

9. The method of claim 8 wherein the first look-up table memory receives gamma adjustment data in accordance with each of 1, 2, 4 or 8 bits per pixel pixel bit depths of the first data signals.

10. The method of claim 9 wherein the fourth multibit signals are defined by 8 bits per pixel for each of 1, 2, 4 or 8 bits per pixel pixel bit depths of the first data signals.

11. The method of claim 10 wherein same valued third multibit signals are provided for recording elements having similar brightness characteristics.

12. The method of claim 8 wherein the first look-up table memory receives gamma adjustment data in accordance with each of 1, 2, or 4 bits per pixel pixel bit depths of the first data signals.

13. The method of claim 7 wherein a driver drives current to a recording element during each of plural sub-pixel intervals and durations of on-time of the recording elements are different during at least some of the intervals.

14. The method of claim 7 wherein the recording elements are enabled to record electrostatic images on the recording medium and the electrostatic images are developed with toner particles and the toner particles have a volume weighted average particle size of less than 6 μm.

15. The method of claim 14 wherein toner particles of different colors are used to develop the electrostatic images.

16. A non-impact recording apparatus comprising:

a plurality of recording elements;

a source of first data signals representing for each of plural pixels at a predetermined pixel bit depth, a density, size or percentage coverage for recording each of the pixels;

a first look-up table memory that stores multibit gamma adjustment data pertinent to the predetermined pixel bit depth and is responsive to the first data signals for adjusting the first signals with an adjustment related to a characteristic of the apparatus and generating second data signals;

a second look-up table memory for generating third multibit signals related to a characteristic of the recording elements;

a third look-up table memory having as inputs thereto the second data signals and the third signals and generating in response to the inputs fourth multibit data signals to provide recording signals for recording pixels by the recording elements; and a control for loading multibit gamma adjustment data into said first look-up table memory, the control being operational with different predetermined pixel bit depth modes of the first data signals to load the first look-up table memory with gamma adjustment data corresponding to the pixel bit depth of the first data signals.

17. The apparatus of claim 16 wherein the first look-up table memory provides for adjustment of data for each of plural colors used for developing a multicolor image.

18. The apparatus of claim 17 wherein the control is operative in different modes to provide the first look-up table memory to receive adjustment data in accordance with each of 1, 2, or 4 bits per pixel pixel bit depths of the first data signals.

19. The apparatus of claim 18 wherein the fourth multibit signals are defined by the same number of bits in each of the modes regardless of the pixel bit depths of the first data signals.

20. The apparatus of claim 19 wherein the second look-up table memory provides a same valued second multibit signal for light-emitting recording elements having similar brightness characteristics.

* * * * *